F. BEEMER.
GEAR CHANGING MECHANISM.
APPLICATION FILED MAY 9, 1913.
1,198,000.
Patented Sept. 12, 1916.
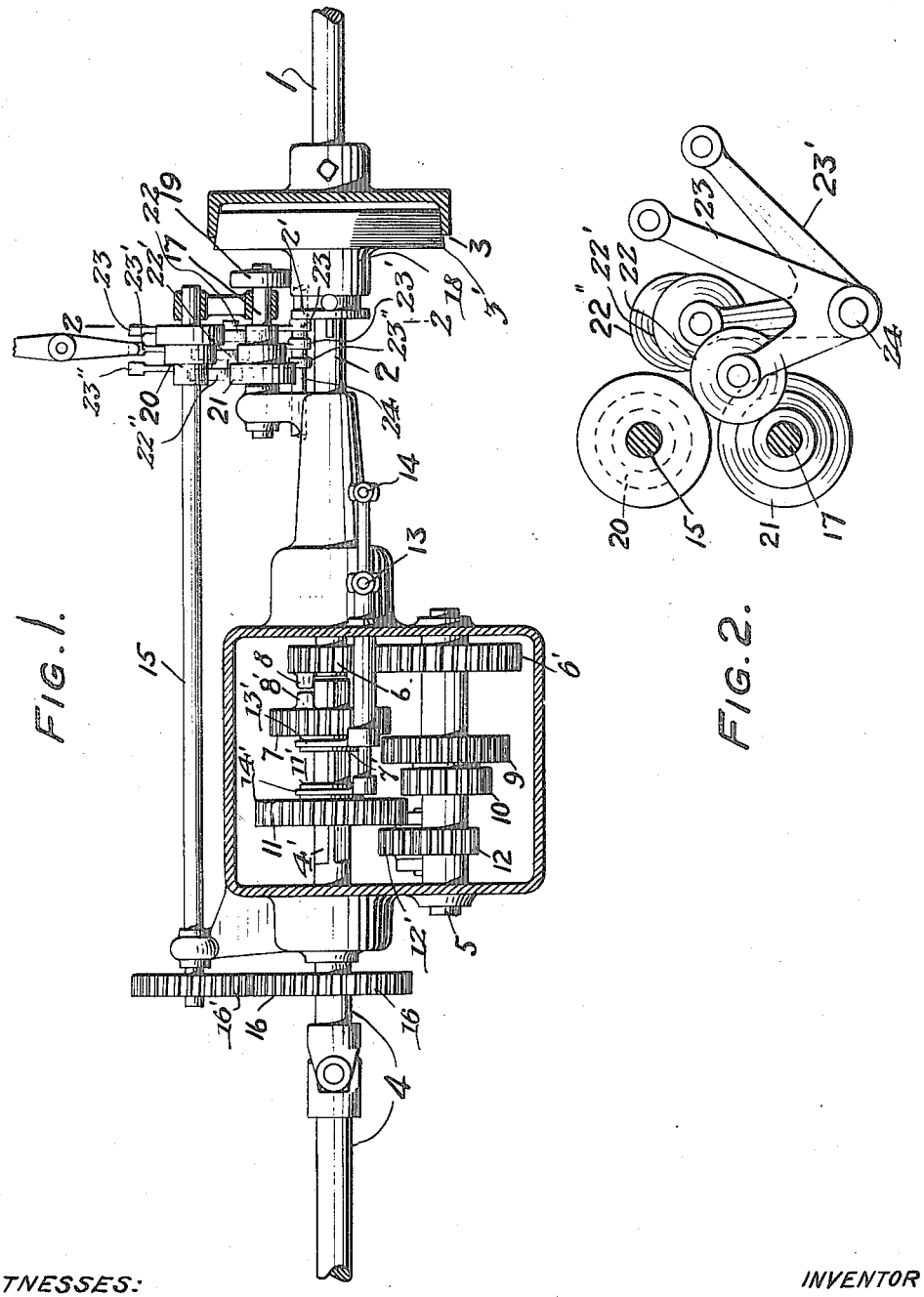
WITNESSES:
INVENTOR
Frank Beemer
BY
Augustus B. Stoughton
ATTORNEY.

UNITED STATES PATENT OFFICE.

FRANK BEEMER, OF PHILADELPHIA, PENNSYLVANIA, ASSIGNOR OF ONE-HALF TO BUDD G. NICE, OF OGONTZ, PENNSYLVANIA.

GEAR-CHANGING MECHANISM.

1,198,000. Specification of Letters Patent. Patented Sept. 12, 1916.

Application filed May 9, 1913. Serial No. 766,485.

*To all whom it may concern:*

Be it known that I, FRANK BEEMER, a citizen of the United States, residing at the city of Philadelphia, in the county of Philadelphia and State of Pennsylvania, have invented certain new and useful Improvements in Gear-Changing Mechanism, of which the following is a specification.

The principal object of the present invention is to prevent the so-called clashing of gears when they are shifted and to thus obviate the wear, damage and annoyance incident to clashing gears and at the same time to provide for making any change among the gears that may be desired.

The invention will be claimed at the end hereof but will be first described in connection with the embodiment of it chosen from among other embodiments for illustration in the accompanying drawings in which—

Figure 1, is a side view, more or less diagrammatic and principally in section, of gear changing mechanism embodying features of the invention, and Fig. 2, is a sectional view taken on the line 2—2, of Fig. 1.

The mechanism illustrated in the drawings comprises the engine shaft 1 and an alined shaft 2 adapted to be revolved thereby through a friction clutch comprising the member 3 fixed on the shaft 1 and the member 3' connected to the shaft 2 by a spline 2', the shaft 2 being adapted for revolving the shaft 4 through the following change speed devices. The shaft 2 is connected with and constantly revolves the counter shaft 5 through the engaging gear wheels 6 and 6' fixed on the respective shafts. The shaft 4 has a gear wheel 7 connected thereon by a spline 4' whereby it is adapted to be connected with the wheel 6 through the clutch members 8 and 8' to produce the highest speed and alternately therewith with the gear wheel 9 fixed on the shaft 5 to produce the next lower speed, the wheel 7 also being adapted to occupy an intermediate position permitting it to revolve independently of the wheels 6 and 9. A gear wheel 11 is connected with the shaft 4 by the spline 4', whereby it is adapted to be connected with the gear wheel 10 fixed on the shaft 5 to produce the lowest speed and alternately therewith with the idler gear 12' engaging the gear wheel 12 on the shaft 5 to reverse, the wheel 11 being adapted to run independently between the wheels 10 and 12'. A longitudinally movable rod 13 is provided with a yoke 13' which engages a hub 7' revolving therein and fixed to the wheel 7, and a longitudinally movable rod 14 is provided with a yoke 14' which engages a hub 11' revolving therein and fixed to the wheel 11, the rods acting through their forks to shift the respective wheels.

The foregoing mechanism represents a type of the usual constructions to which my improvements are applicable, as hereinafter described.

In the form of my improvements illustrated, a journaled counter shaft 15 is driven by the shaft 4 through the gear wheels 16 and 16', the revolution of the two shafts being in such ratio as may be desired. A journaled shaft 17 has fixed thereon a friction disk or roller 19 adapted to be engaged by the conical hub 18 of the clutch member 3' when the latter is withdrawn from its engagement with the clutch member 3. Reversely stepped cone pulleys 20 and 21, fixed on the respective shafts 15 and 17, are adapted to be connected by the idlers 22, 22', and 22'' carried by the respective crank levers 23, 23' and 23'' adapted to be rocked independently on the shaft 24.

When the shaft 1 is driving the shaft 2 through the engaged clutch members 3 and 3', the shaft 2 will be caused to drive the shaft 4 directly at high speed by engaging the clutch members 8 and 8', which is effected by shifting the wheel 7 along the shaft 4 by means of the parts 13 and 13'. When it is desired to change the gears, to obtain the next lower speed, the member 3' is disengaged from the member 3, the hub 18 is engaged with the roller 19 and the idler 22 is thrown into engagement with the largest section of the pulley 20 and the smallest section of the pulley 21, whereby the shaft 15, connected with the shaft 4 through the gears 16 and 16', is frictionally connected with the shaft 2 to effect a rate of speed between the shafts 2, 4, and 5 such that the gear wheel 7, which has been disengaged from the wheel 6, can be shifted into engagement with the gear wheel 9 without clashing, because these wheels 7 and 9 have had imposed upon them substantially the same peripheral speed. When it is desired to change the gears to lowest speed, the member 3' being disengaged from the member 3 and the member 19 engaged by the member 18, the idler 22' is caused to engage the intermediate section of the pulley 20 with the intermediate section of the pulley 21, whereby, upon the disengagement of the wheel 7 from the wheel 9, the shafts 2, 4, and 5 have imposed upon them relative rates of speed such that the wheels 10 and 11 have substantially the same peripheral rate, permitting the latter to be shifted into engagement with the former without clashing. When it is desired to change from the lowest to the highest speed, the member 3' is disengaged from the member 3, the member 18 is engaged with the member 19, and the member 22'' is engaged with the smallest section of the pulley 20 and the largest section of the pulley 21.

When it is desired to throw in the reverse, the member 3' being disengaged from the member 3 and the member 19 engaged by the member 18, an idler is thrown into engagement with the pulleys 20 and 21, which acts as a brake, and slows down the speed of the shafts 2 and 4 which must be stopped to permit the wheel 11 to be thrown into engagement with the idler 12'.

It will therefore be seen that prior to engaging the respective sets of gears transmitting different speeds between the alined shafts, the speeds of the latter shafts are coördinated through the means comprising the change speed pulleys and the gears to be engaged are brought to substantially the same peripheral speeds so that their engagement can be effected without the clashing, shock, wear and breakage that commonly take place.

While the mechanism is designed primarily for use in operating motor vehicles, it will be obvious that it will be applicable in various relations where change speed gearing is employed and that the specific form of the mechanism may be variously modified within the scope of my invention.

Having described my invention, I claim:

1. The combination of a pair of journaled shafts, means whereby said shafts are adapted to be connected to revolve at a predetermined speed relation, devices whereby said shafts are adapted to be connected to revolve at a different speed relation, and means comprising a counter-shaft and gears constantly connecting it in operative relation with one of said shafts for coördinating the speed relation of said shafts and devices whereby the latter are adapted to be engaged without shock.

2. The combination of a pair of journaled shafts, a journaled counter shaft, a plurality of sets of gears whereby said shafts first named are adapted to be connected through said counter shaft to change the speed ratios of said shafts first named, and means for coördinating the speeds of gears aforesaid prior to their engagement, said means comprising a second counter-shaft, mechanism for positively connecting said counter shaft with one of said journaled shafts and mechanism for frictionally connecting said second counter shaft with the other of said journaled shafts.

3. The combination of a pair of journaled shafts, a journaled counter-shaft, means comprising a plurality of sets of change speed gears whereby said shafts first named are adapted to be connected and revolved at different speed ratios through said counter-shaft, a second counter-shaft, and means comprising engaging gears and frictional devices coacting with said second counter-shaft whereby a plurality of changes of speed ratios of said shafts first named are adapted to be effected.

4. The combination of a pair of journaled shafts, means comprising a plurality of sets of change speed gears whereby said shafts are adapted to be revolved at different speed ratios, and means comprising independently rocking devices and friction members adapted for engagement thereby for regulating the speed ratios of said shafts to substantially those produced by the respective sets of change speed gears prior to engaging said change speed gears.

5. The combination of three shafts, clutching members for connecting the first and second of said shafts, and speed coördinating mechanism for revolving the third shaft at different predetermined ratios to the speed of the second shaft, said speed coördinating mechanism comprising fulcrumed levers and pulleys thereon adapted for connecting said second and third shafts to operate at different speed ratios and being actuated by the operation of disengaging said clutching members.

In testimony whereof I have hereunto signed my name.

FRANK BEEMER.

Witnesses:
CLIFFORD K. CASSEL,
S. R. M. GILLIGAN.